July 20, 1943.   F. P. DAVIS   2,324,566
PUZZLE
Filed Aug. 24, 1942   3 Sheets-Sheet 1
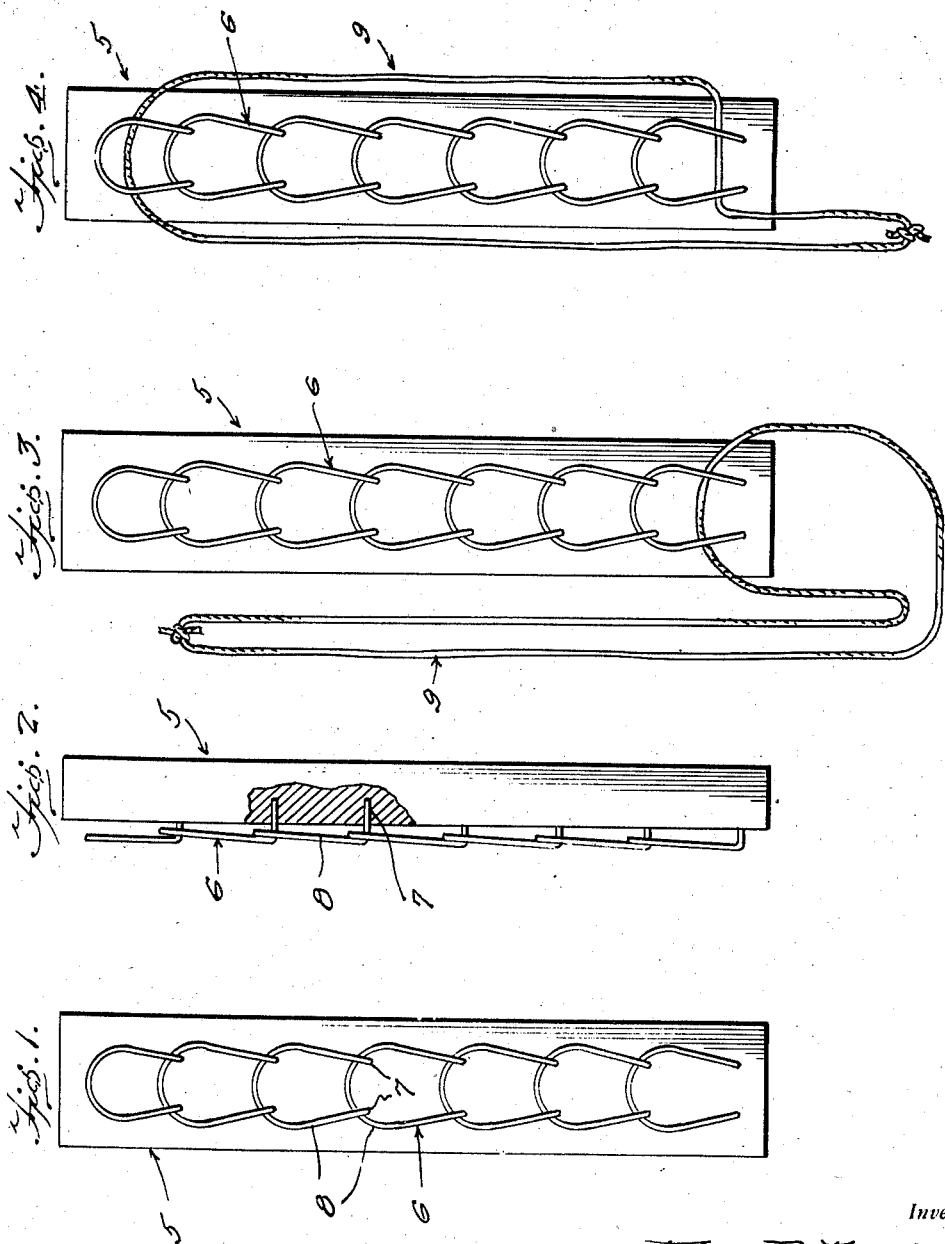
Inventor
Fay P. Davis
By Clarence A. O'Brien
and Harvey B. Jacobson
Attorneys

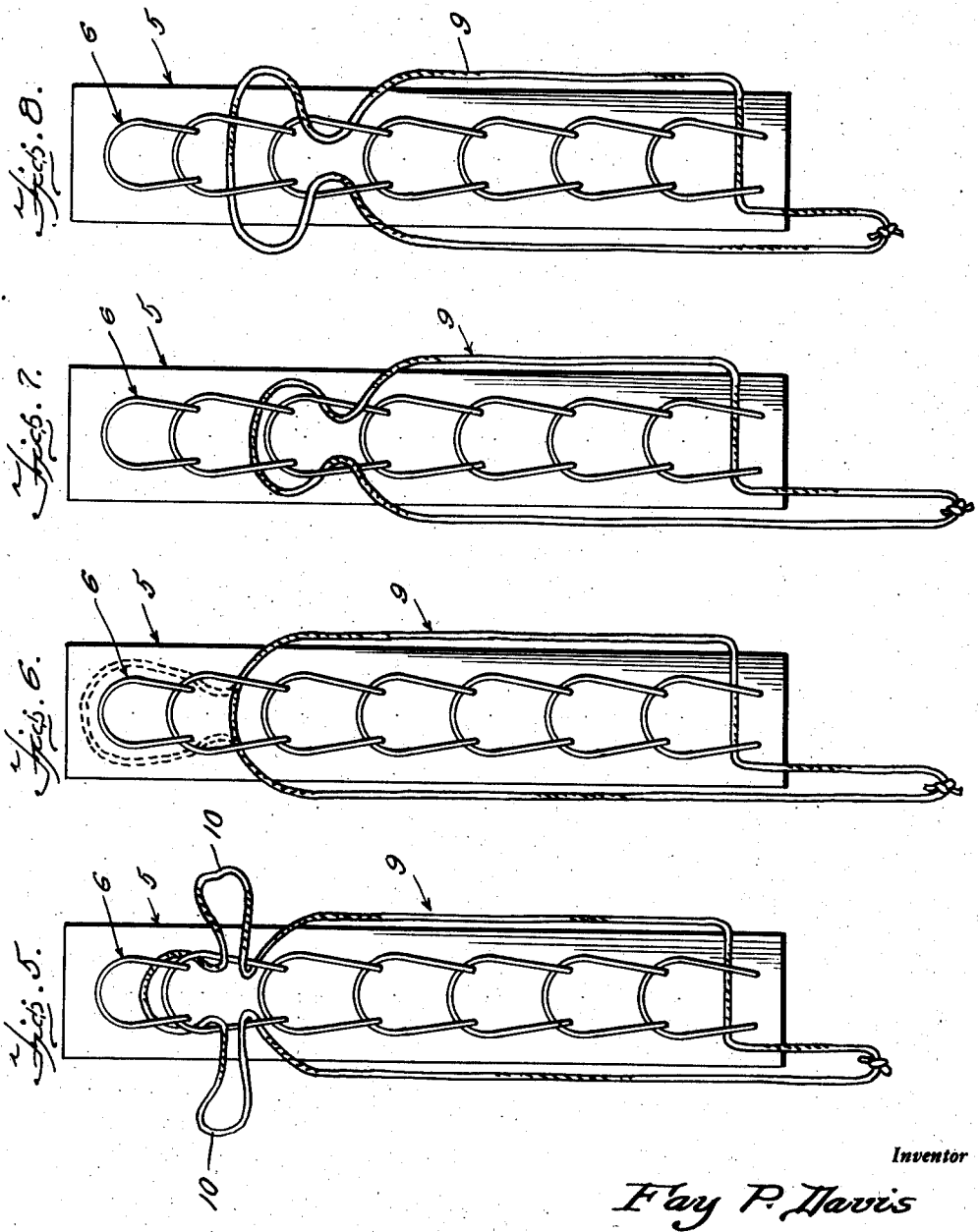

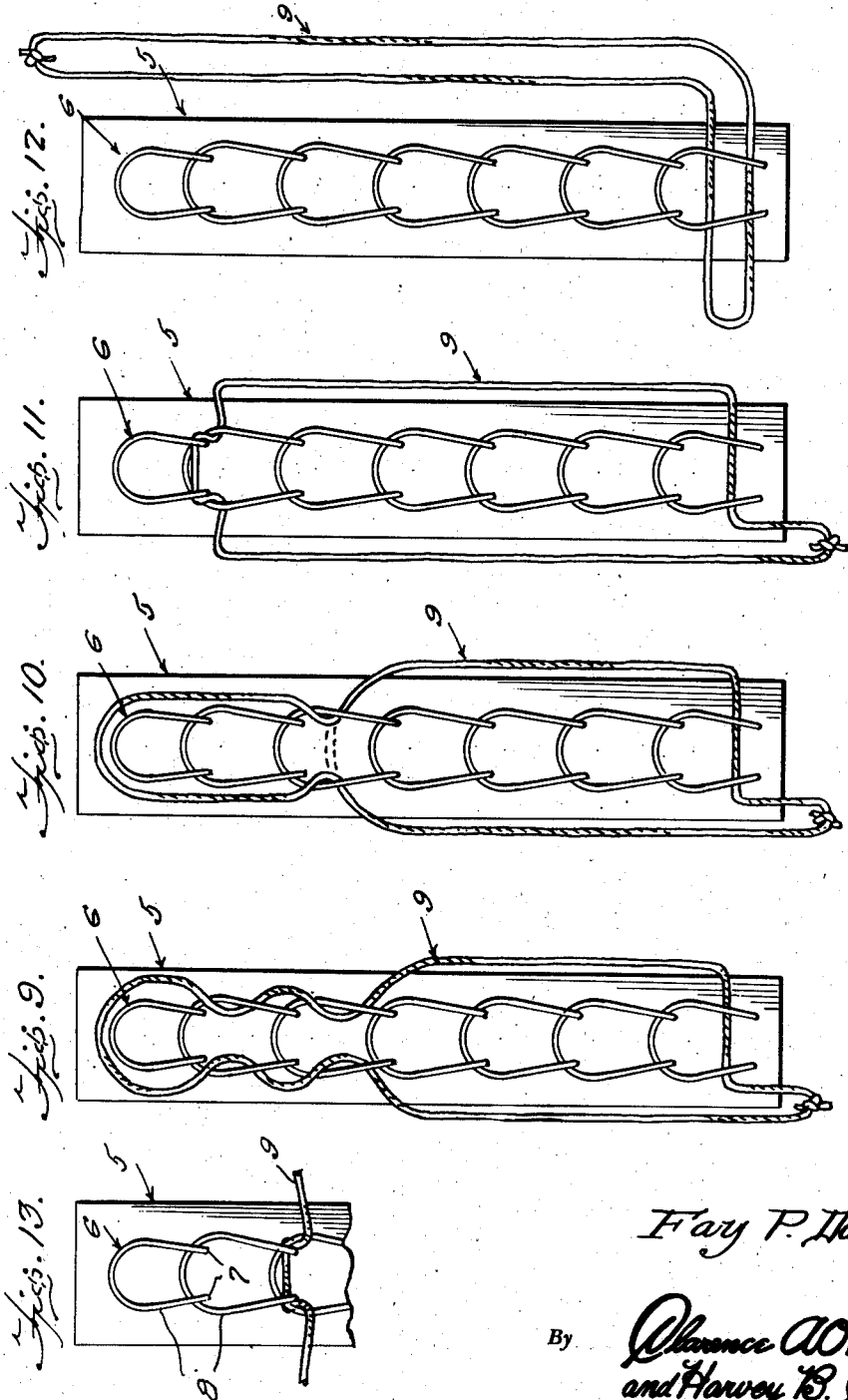

Patented July 20, 1943

2,324,566

UNITED STATES PATENT OFFICE 2,324,566

PUZZLE

Fay P. Davis, Omak, Wash.

Application August 24, 1942, Serial No. 455,928

2 Claims. (Cl. 273—159)

The invention relates to a puzzle, the principal object of the invention being to provide a puzzle having a base or body on which are mounted a series or plurality of connected horseshoe-shaped wire loops, each loop having a stem portion connected to the base and a single-wire bight portion extending substantially parallel to the base, each loop except a terminal loop having its bight portion engaged through that of the next loop, together with a continuous cord adapted to encircle the stem of a terminal loop and to be released by passing the cord along and through the various loops.

Other important objects and advantages of the invention will be apparent from a reading of the following description and the appended drawings, wherein for illustration a preferred embodiment of the invention is shown.

In the drawings:

Figure 1 is a top plan view of the puzzle.

Figure 2 is a right hand side elevational view partly broken away.

Figure 3 is a top plan view showing the cord in initial or starting position.

Figure 4 is a similar view showing the cord moved to the second position.

Figure 5 is a similar view showing the cord arranged in the third position.

Figures 6, 7, 8, 9, 10, 11 and 12 are similar views showing the cord arranged in the fourth, fifth, sixth, seventh, eighth, ninth, and tenth or final positions, respectively.

Figure 13 is a fragmentary top plan view showing how the cord is snapped forwardly from one loop to the next.

Referring in detail to the drawings, the numeral 5 generally designates an elongated rigid base or body which in this instance is shown as generally rectangular. Secured to or in the top of the base at equally spaced longitudinal intervals are the loops 6, seven in number in the illustrated example. The loops in the shape of open ended horse shoes each comprise laterally spaced short vertical legs 7 on the terminal or open ends of the arms of horse-shoe shaped single-wire bights 8 which lie in planes substantially parallel to the top of the body or base, as shown in Figure 2 of the drawings. Each of the loops consists of a piece of wire bent once in the shape of a horse-shoe with its arms spread open and its free ends turned down to form the two legs 7 to be driven into holes or sockets in the base 5.

The bight of the first loop surrounds the legs of the second loop, the second loop thereby in effect extending forwardly through the first loop. All of the loops are similarly interengaged except the final loop which has its bight free and projecting parallel to the top of the base 5 as shown in Figure 2.

The cord 9 need be only of sufficient length to permit the various maneuvers from the final loop without untying the cord or disconnecting any loop.

To work the cord into a similar position under the third and succeeding loops, the above procedure is repeated. Each repetition involves bringing the cord around and under the first wire loop as indicated in Figure 9 and working down through the loops as described until the last loop is reached as shown in Figure 12, and the cord is free.

In proceeding to remove the cord, the cord is strung around the uppermost one of the loops 6 as shown in Figure 4 with the flights of the cord along opposite sides of the series of loops. Portions 10 of the said flights are then looped as shown in Figure 5 and passed upwardly and laterally outwardly through the next one of the loops 6. The portion of the cord between these loops is then passed around and under the first wire loop 6. Lateral pull is then exerted on the loops 10 until the portion of the cord between the loops 10 is tensioned against the legs 7 of the first loop, as indicated in Figure 13. From this position the side flights of the cord are pulled downwardly so as to snap the portion of the cord between them to a position under the second loop, as shown in full lines in Figure 6.

Having described the invention, what is claimed as new is:

1. A puzzle comprising a plate body, a series of substantially horse-shoe shaped single-wire loops with open ends spaced along one side of said body substantially parallel to the face of said board, said loops consisting of bight portions and stem portions with hooked free ends forming securing elements supportably connected in sockets furnished in said body, and a looped cord loosely encircling the stem portions of one of the wire loops.

2. A puzzle as described in claim 1, the bight portions of one of the wire loops being tensioned against the adjacent said stem portions of an adjacent wire loop whereby the cord must be forcibly pulled to pass between the mutually tensioned parts.

FAY P. DAVIS.